3,193,006
PETROLEUM RECOVERY WITH INERT GASES
Warren K. Lewis, Newton, Mass., assignor, by mesne assignments, to Esso Production Research Company, Houston, Tex., a corporation of Delaware
Filed Nov. 3, 1961, Ser. No. 150,005
1 Claim. (Cl. 166—7)

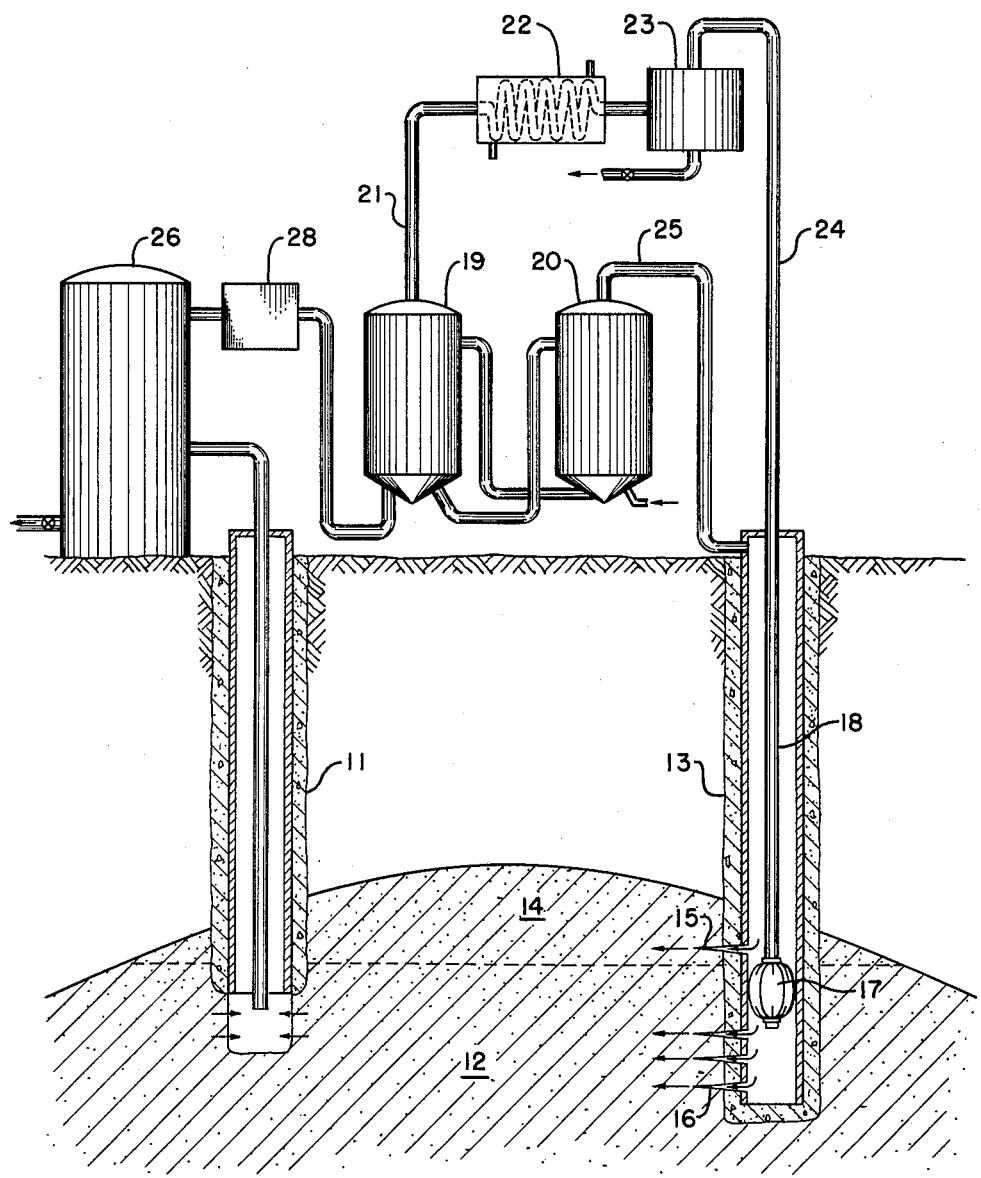

This invention is directed to the recovery of petroleum from subterranean reservoirs. Broadly, the invention is a method of combining a gas cap drive recovery with a miscible fluid displacement drive. More specifically, the invention is directed to the injection of nitrogen as a gas cap drive, concurrently with the injection of carbon dioxide into the oil zone as a miscible displacement drive. As a preferred embodiment, the invention is also concerned with a unique method for preparing separate injection streams of substantially pure carbon dioxide and substantially pure nitrogen gas.

In the recovery of petroleum from a subterranean reservoir it is common knowledge that the various forms of natural reservoir energy are never a wholly adequate means of displacing the oil from the ground. It has been common practice therefore to supplement native reservoir energy, either during the early stages of oil production or, more often, after the reservoir has approached its economic production limit by natural recovery methods. Various injection techniques have been employed to supplement natural pressure drives, including both gas and liquid injection to provide artificial pressure drives. Thus it is old to inject various gases into the reservoir, such as air, hydrocarbon gases, flue gases and the like, including carbon dioxide, nitrogen and mixtures thereof. The contribution provided by this invention, then, lies in the concurrent injection of substantially pure carbon dioxide and substantially pure nitrogen at spaced, strategic locations within the reservoir.

The oil produced from a subterranean reservoir usually contains substantial quantities of dissolved hydrocarbon gases, predominantly methane. When the reservoir pressure on the oil is released, large volumes of gases escape. Although it is an extremely wasteful practice, these gases are commonly flared in the atmosphere. This invention provides a valuable solution to the problem of how to avoid such waste. That is, the gases are oxidized to produce $CO_2$ for injection into the oil reservoir.

In accordance with the invention, in a reservoir amenable to a gas cap drive, an injection well and a production well are provided. The injection well is cased in the usual manner and provided with perforations at two separate levels. Perforations for nitrogen injection are provided at the upper region of the reservoir so that either the natural gas drive may be supplemented or an artificial nitrogen gas drive may be provided. Separated from the nitrogen injection perforations are the carbon dioxide injection perforations. The latter perforations are provided in a lower region of the reservoir, within the oil zone, and preferably near the gas-oil interface. These two injection levels are separated by suitable packing means so that substantially pure nitrogen may be introduced at the upper level and substantially pure carbon dioxide may be concurrently injected at the lower level. Nitrogen is injected as the gas cap drive because of its immiscibility with the oil and its ready availability in the atmosphere. Carbon dioxide is especially suited for the oil phase injection because of its miscibility with the oil and its proven effectiveness in reducing the viscosity of the oil and in producing an efficient displacement of the oil. Suitably spaced from the injection well one or more production wells are provided for recovery of the oil displaced from the reservoir.

It is also contemplated that the two injection levels and a production string may be provided in a single well bore. However, this embodiment is somewhat less practical for obvious reasons and is not normally employed.

The invention is applicable to virgin reservoirs and also partially depleted reservoirs, provided, however, that the reservoir has not been depleted to the extent that the injected gas would bypass the oil.

As an additional feature of the invention, comprising the preferred embodiment thereof, separate injection streams of substantially pure nitrogen and substantially pure carbon dioxide gas are efficiently produced at the surface of the earth in a two vessel system. The carbon dioxide is formed in one vessel by the reaction of a gaseous hydrocarbon with fluidized $Fe_2O_3$ according to the following equation:

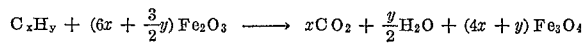

$$C_xH_y + (6x + \tfrac{3}{2}y)Fe_2O_3 \longrightarrow xCO_2 + \tfrac{y}{2}H_2O + (4x+y)Fe_3O_4$$

Nitrogen gas is then recovered from the other vessel by a controlled reaction of air with the $Fe_3O_4$ product from the hydrocarbon oxidation reactor, the oxygen in the air reacting to form $Fe_2O_3$ which is returned to the first reactor for the production of additional $CO_2$. The carbon dioxide, after the removal of water by condensation, is then injected into the oil phase as mentioned above. Complete details of how the nitrogen and carbon dioxide are produced in the above manner are disclosed in U.S. Patent 2,665,971 to Warren K. Lewis and Edwin R. Gilliland. Although the patent disclosure is directed primarily to the production of pure carbon dioxide, only a slight modification of that process is required to produce pure nitrogen also, as explained below.

A more detailed description of the preferred embodiment of this invention is provided by reference to the accompanying drawing. Production well 11 is completed in communication with oil zone 12. Injection well 13 is completed in communication with both the oil zone 12 and the gas cap 14. Perforations 15 and 16 are provided in communication with the gas cap and with oil zone 12, respectively. Perforations 16 are separated from perforations 15 by packer 17 through which tubing 18 extends.

Above the surface of the earth, the system for producing the separate streams of carbon dioxide and nitrogen includes reactor vessel 19 wherein ferric oxide reacts with the hydrocarbon to produce $CO_2$, and reactor vessel 20 wherein air is reacted with ferrosoferric oxide to produce ferric oxide, thus providing a substantially pure stream of nitrogen from the air introduced. Conduit 21 leads to condenser 22 and accumulator 23, and conduit 24 leads to well head and tubing 18. Conduit 15 leads to the well casing and perforations 15.

In operation, a hydrocarbon gas, for example methane recovered from separator 26, is preheated in heater 28 to a temperature just below cracking and then is introduced into reactor 19 maintained at conditions suitable for reacting the hydrocarbon with ferric oxide to produce carbon dioxide. The reactant proportions must be controlled to provide excess ferric oxide in order to favor the production of $CO_2$ to the substantial exclusion of CO. This reaction takes place over a wide range of temperatures; however, an upper limit of 1200° C. is observed in order to avoid sintering of the oxide. A temperature between 800 and 1000° C. is usually employed. The carbon dioxide produced is passed overhead through conduit 21 to condenser 22 wherein the water vapor produced by the reaction is condensed and is then collected in accumulator vessel 23. The $CO_2$ is passed by conduit 24 and tubing 18 through perforations 16 and into the oil zone of the reservoir.

The ferrosoferric oxide produced in reactor 19 is passed to reactor 20 wherein it is reoxidized by air to produce additional ferric oxide for return to reactor 19. In the Lewis-Gilliland patent mentioned above the sole function of reactor 20 was to convert the ferrosoferric oxide to ferric oxide for reuse in vessel 19. However, for the purposes of this invention slight modification of this concept is necessary. That is, the introduction of air into vessel 20 must be controlled such that substantially all the oxygen is consumed from the air, leaving substantially pure nitrogen off-gas passing into conduit 25. The nitrogen thus produced is passed into the casing of well 13 and injected through perforations 15 into the gas cap zone.

The conditions maintained in vessel 20 are chosen for efficient removal of oxygen from the air. This step is carried out at temperatures slightly higher than those found in reactor 19, preferably in the range of 1000 to 1200° C., with the provision as before that sintering of the oxide must be avoided.

The manipulative details of the system which produces the $CO_2$ and $N_2$ are not a part of this invention. These details, including the method of fluidization, the method of achieving efficient contact between the gases and the solids, and the transfer of the two oxide forms between the respective reaction vessels may be obtained by reference to the above mentioned Lewis and Gilliland patent.

The invention is not limited to the use of ferric oxide as an oxygen carrier between reactors 19 and 20. Other suitable oxides are cupric oxide, vanadium pentoxide and stannic oxide.

It will readily be understood by one skilled in the art that the invention is not limited to a dome reservoir as shown in the drawing, but is applicable in an ordinary dip reservoir as well. The only essential limitation being of course that the reservoir is amenable to the formation of a gas cap drive. The wells penetrating the producing horizon may be pre-existing wells in the area, or they may be drilled for the purpose of carrying out this invention. It should be noted that the producing well need not penetrate the gas cap zone but need merely penetrate the oil zone.

An alternate system for producing separate streams of substantially pure carbon dioxide and substantially pure nitrogen involves, for example, the complete oxidation of a hydrocarbon gas to produce a flue gas comprising nitrogen and carbon dioxide in admixture. The mixture is then passed through a conventional absorption tower to produce a carbonate solution from which the off-gas recovered is substantially pure nitrogen, and the carbonate solution is subsequently heated to release the purified $CO_2$.

It is an outstanding feature of this invention that the injection gases, carbon dioxide and nitrogen, are not only an especially efficient combination of fluids for the dual injection technique of displacing the oil, but are also readily produced from the air, and from natural hydrocarbon gases. Miscible displacement has also been proposed by injecting liquid propane and/or butane (L.P.G.) instead of $CO_2$; however, those fluids are seldom available in sufficient quantity to be of practical value.

Other features of this invention center about the prior art knowledge that a carbon dioxide displacement works best at pressures in the order of 3,000 to 4,000 p.s.i. or higher and that the carbon dioxide is preferably substantially pure. Thus the separate injection of nitrogen as a gas cap drive provides not only a drive mechanism of oil recovery but also provides a convenient method for maintaining the high pressures required for the best results from the carbon dioxide displacement. It would be entirely unsuitable to introduce carbon dioxide and nitrogen as a mixture, an example of which is ordinary flue gas. The following experiment illustrates this fact.

An experiment was conducted to determine the relative efficiencies of displacement for $CO_2$ alone, nitrogen alone, and flue gas. The oil displaced in this experiment was Venezuelan Eocene crude and was maintained at a temperature of 180° F., which corresponds to the temperature of a typical reservoir wherein such oil is found. The oil was displaced from 25 feet of ¼ inch tubing packed with glass beads and immersed in a constant temperature bath. The data represent the percent recovery at 15,000 cubic feet of gas per barrel of (terminal gas-oil ratio) stabilized oil, based on the initial hydrocarbon volume.

| Gas | 1,400 p.s.i | 3,900 p.s.i |
|---|---|---|
| $CO_2$ | 42 | 88 |
| $N_2$ | 20 | 25 |
| Flue Gas | | 25 |

Thus it is readily seen that the $CO_2$ injected must be substantially pure and at relatively high pressure in order to obtain the best results. It is also seen that nitrogen alone, or in admixture with $CO_2$ (flue gas), is entirely unsuitable.

What is claimed is:

A method for recovering petroleum from a subterranean gas cap reservoir penetrated by an injection well and a production well which comprises reacting ferrosoferric oxide with air to remove oxygen from the air, thereby producing ferric oxide and a substantially pure stream of nitrogen gas, reacting said ferric oxide with a gaseous hydrocarbon to produce carbon dioxide and ferrosoferric oxide, injecting said nitrogen into the gas cap of said reservoir, concurrently and separately injecting said carbon dioxide into the oil zone of said reservoir, producing displaced petroleum from said production well, separating hydrocarbon gases from said produced petroleum, and reacting said separated gases with said ferric oxide.

References Cited by the Examiner

UNITED STATES PATENTS

| | | | |
|---|---|---|---|
| 2,623,596 | 12/52 | Whorton et al. | 166—7 |
| 2,665,971 | 1/54 | Lewis et al. | 23—150 |
| 2,729,291 | 1/56 | Haverfield | 166—7 |
| 2,875,833 | 3/59 | Martin | 166—9 |
| 2,885,003 | 5/59 | Lindauer | 166—9 |
| 2,994,373 | 8/61 | Stone | 166—9 |
| 3,064,729 | 11/62 | Lindley | 166—9 |

OTHER REFERENCES

Reidel, J. C.: "Simultaneous Gas and Water Injection," The Oil and Gas Journal, November 7, 1955, pages 120, 121 and 123.

BENJAMIN HERSH, *Primary Examiner.*

CHARLES E. O'CONNELL, *Examiner.*